Figure 1:
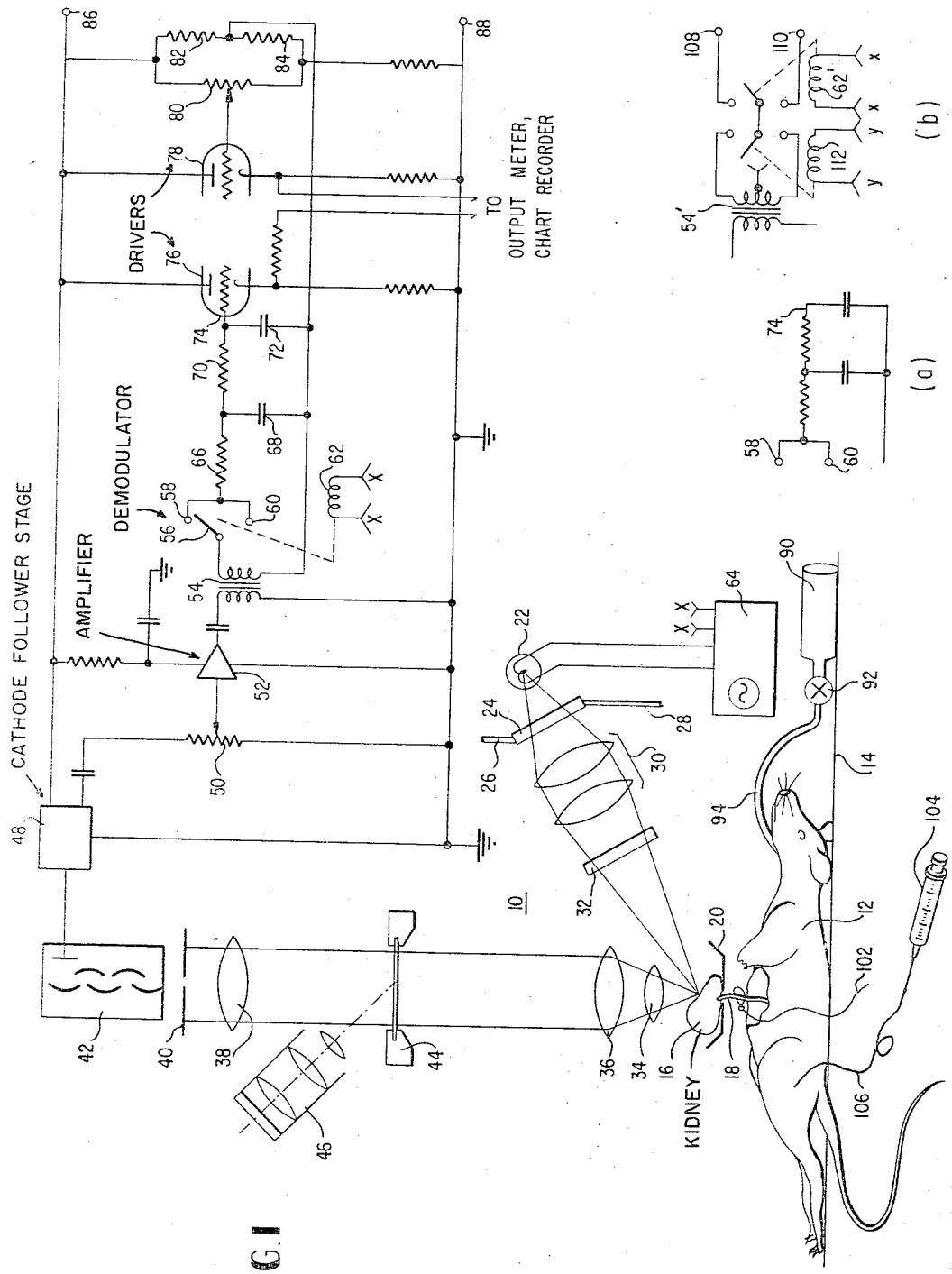

April 11, 1967

B. CHANCE ET AL 3,313,290

SPECTROFLUOROMETER

Filed Aug. 14, 1963

2 Sheets-Sheet 1

INVENTORS
BRITTON CHANCE
VICTOR A. LEGALLAIS
BY
*Stowell & Stowell*
ATTORNEYS

April 11, 1967     B. CHANCE ET AL     3,313,290
SPECTROFLUOROMETER
Filed Aug. 14, 1963     2 Sheets-Sheet 2
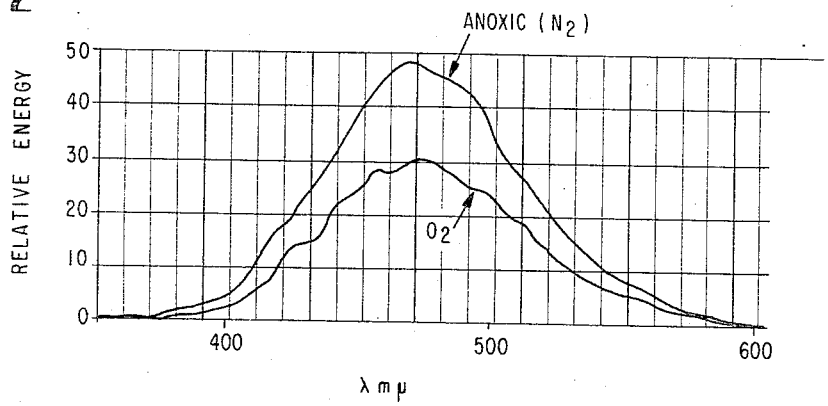
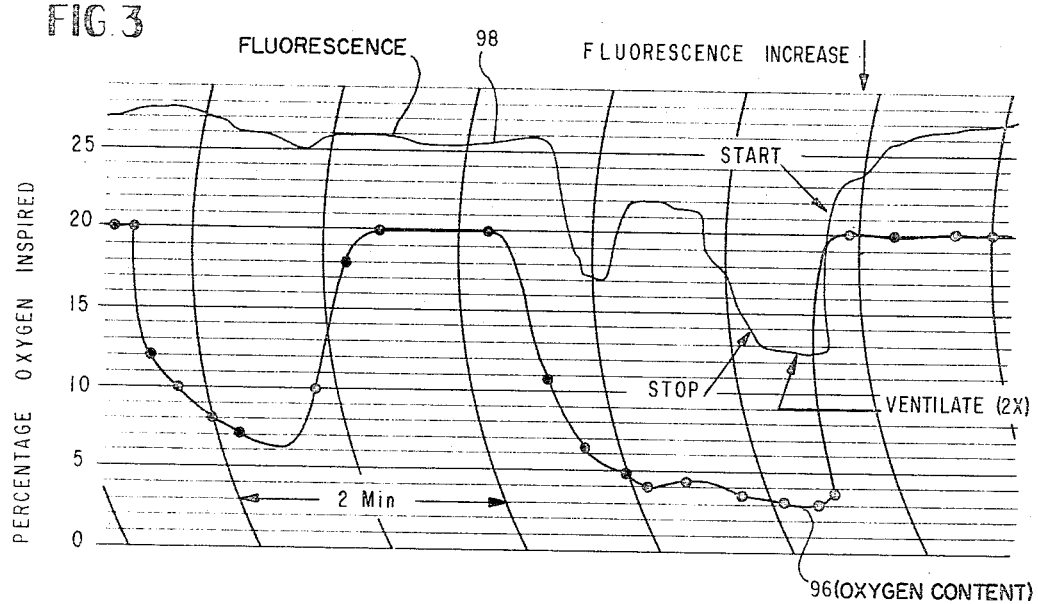
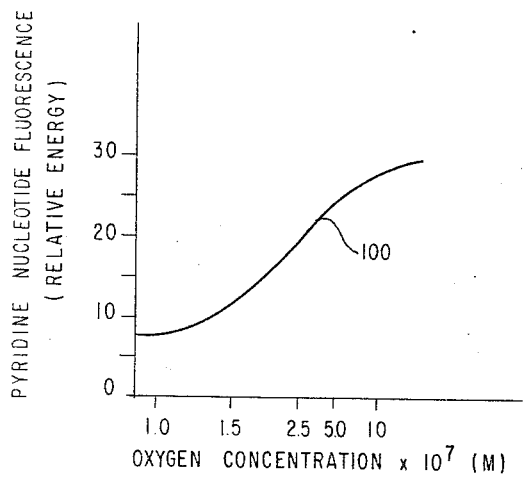
INVENTORS
BRITTON CHANCE
VICTOR A. LEGALLAIS
BY
Stowell & Stowell
ATTORNEYS

United States Patent Office 3,313,290
Patented Apr. 11, 1967

3,313,290
SPECTROFLUOROMETER
Britton Chance, Philadelphia, and Victor A. Legallais, Havertown, Pa., assignors, by mesne assignments, to Research Corporation, New York, N.Y., a non-profit New York corporation
Filed Aug. 14, 1963, Ser. No. 302,093
6 Claims. (Cl. 128—2)

This invention relates to a method and apparatus for the nondestructive measurement, observation, and recording of the intracellular oxidation-reduction states of living tissue, and more specifically to methods and means for determining the same by the use of spectrofluorometer techniques.

Direct observation of intracellular biochemical events and their relationship to physiological function presents a challenging and long-standing problem. The determination of intracellular oxygen levels in tissues has been the subject of much discussion, but even the most refined method for measuring oxygen tension in blood and tissue fails to indicate the oxidation-reduction states of the respiratory carriers. Observations of the latter are especially important because they reflect the intracellular levels of phosphate and phosphate acceptor which control the intensity of cell metabolism.

Methods for the visual spectroscopic observation of changes in the oxidation-reduction level of cytochrome c of the thoracic muscles of the wax moth have been known for almost forty years, and a method for continuously recording the degree of oxygenation of hemoglobin and myoglobin in vivo caused by contractions in cat soleus muscle was developed about twenty-five years ago. However, the first-mentioned observation methods were restricted in their applications to organs and tissues that are relatively free of hemoglobin and myoglobin, and the later method for recording the oxy-hemoglobin and oxy-myoglobin concentrations gave no true indication of the intracellular oxidation-reduction state, since early workers in the art recognized that the affinity of cytochrome oxidase for oxygen greatly exceeded that of hemoglobin and even myoglobin.

By "introcellular oxidation state" reference is made to the ratio of oxidized-reduced enzyme, particularly the iron enzymes, cytochromes, or pyridine nucleotide enzymes. This quantity is considered a much more incisive indication of the availability of oxygen to tissues from the blood vessels. The oxidation state is also affected by the level of substrate, glucose, lactate, etc., present in the tissue and the energy demands made upon the tissue as well.

More recently, observations and recordings of changes of pigments in nerves and cytochromes in roots have been made, and recordings of oxidation-reduction states of cytochromes and pyridine nucleotide, particularly cytochrome b have been achieved in excised animal muscles by several workers through the use of the double-beam spectrophotometer. It is to be noted that such recordings have not been performed in vivo in the presence of circulating blood flow.

It has been known that the chief part of the fluorescence emission of an irradiated cell or its isolated mitochondria is due to the reduced pyridine nucleotide component of this mitochondria. Intracellular oxygen levels are measurable as changes in the absorption band properties of the pyridine nucleotide component of the respiratory chain. Such changes are readily observable, and may take the form of a variation in the emission intensity level, or a broader, or narrower, or displaced fluorescence band from that of the whole cell in a normal oxidation state.

However, until the discovery of the present invention, observations made by spectrophotometric measurements of fluorescence emission have been restricted to excised tissues, which were free from blood. Both spectrophotometric measurements of light transmission through thin strips of muscles, such as that of the frog sartorius, and measurements of fluorescence emission from tissues presenting only one free surface available for excitation have been made, but the methods are considered unsatisfactory for living tissues having circulating blood, due to reduced sensitivity attributed to absorption by hemoglobin.

Thus, tissues which can be perfused and excised to reduce the hemoglobin content permit spectroscopic measurements of pyridine nucleotide and cytochrome components.

Applicants, after extensive fluorometer examinations of excised tissues that contained blood or were free from blood, discovered upon experimentation that the oxidized-reduced changes in the fluorescence intensity of the pyridine nucleotide component could be measured satisfactorily in the presence of blood cells. One possible explanation of this discovery, although this invention is not to be limited by any particular theory or conclusion as to a particular mode of operation, is believed to be that the blood cells apparently absorb the energies, both of the spectrofluorometric excitation and of the resultant cell emission intensities to approximately the same extent in the oxygenated and disoxygenated conditions. Since, however, damage to the tissue may well occur in the interval between the excision slicing and examination in the fluorometer, a more desirable method of examining animal organs and tissues in vivo was developed in accordance with the invention.

By application of the principles of their discovery, applicants have avoided the undesirable prior art examination procedures which required excision, perfusion, dye staining or labelling, and the use of high intensities of the fluorometer excitation source which produced rapid cell damage. In accordance with the teachings of the invention, it is possible to utilize low levels of excitation light obtainable through interference filters when operating a spectrofluorometer of combined optical and electrical gain. Particularly, by utilizing microfluorometric techniques of sufficient sensitivity, examination apertures of 5–15 microns ($\mu$) up to a few millimeters diameter can be used to examine and detect less than $10^5$ molecules of reduced pyridine nucleotide in various living animal organs.

Therefore, a primary object of this invention is to provide a method and means to study the localized metabolic response of portions of living tissues to variations in oxygen concentration.

A further object of this invention is to provide method and means as aforesaid which will provide a more accurate measurement of intracellular oxidation-reduction states in tissues without interference from the presence of circulating blood.

Another object of this invention is to apply the principles of fluorescence emission from tissues as a measurement of intracellular oxygen levels.

An additional object of this invention is to provide oxygen level measurement techniques in terms of the diphosphopyridine nucleotide level, thus affording increased sensitivity for the indication of the oxygen level in living organs and tissues having circulating blood.

A more specific object of this invention is to provide method and means for applying a spectrofluorometer for recording intracellular oxidation-reduction states in vivo while subjecting a test animal to changes in the normal circulation of the blood, or changes in the supply of oxygen, or the influence of drugs, or any combination of these three factors.

A specific object of this invention is to utilize the spectrofluorometry of mitrochondrial pyridine nucleotide(s) to produce a continuous measurement of the oxidation state in organs and tissues of living animals.

Other objects, advantages, and features of this invention both as to its organization and method of operation will become apparent from the following description taken in connection with the accompanying drawings, wherein:

FIGURE 1 is a schematic diagram of an exemplary application of the principles of this invention, showing the test animal, and the optics and electrical circuitry for a preferred embodiment of a spectrofluorometer;

FIGURES 1(a) and 1(b) illustrate alternative arrangements of demodulating, to be used with the basic circuit shown as a portion of FIGURE 1.

FIGURES 2 through 4 are graphs and waveforms utilized in explaining the invention.

It is known that in utilizing spectrofluorometric techniques of examination, recordings and measurements may be made either in terms of fluorescence excitation spectra or emission spectra. Applicants have discovered that for the recording of intracellular oxidation-reduction states in vivo the emission spectra are more definitive than the excitation. Thus, while excitation (and absorption) maxima for free and bound pyridine nucleotide are 335 m$\mu$ for the bound and 340 m$\mu$ for the free, and in mitochondria in solution are indistinguishable; on the other hand, fluorescence emission spectra revealed that the bound and free pyridine nucleotide exhibited different fluorescence emission peaks, 463 m$\mu$ and 480 m$\mu$, respectively, on a relative energy basis; and in certain cases a shift or over 30 m$\mu$ between peaks was observed. Thus, the fluorescence emission spectra, and particularly the peaks thereof, identify qualitatively the bound and free material, i.e., are found to be diagnostic for the state of binding of the pyridine nucleotide.

Also, applicants have discovered that further advantages are obtained by recording the emission spectra, in that they are thus free to vary the excitation wavelength in order to control the penetration of excitation into the tissue, and thereby the depth of field under observation. In the foregoing, the unit m$\mu$, a millimicron, is a measurement of wavelength ($\lambda$), and is equal to $\frac{1}{10}\lambda$ expressed in Angstrom units.

Referring now to FIGURE 1, reference numeral 10 generally designates the spectrofluorometer arrangement for recording the oxygen level in a living animal 12 under observation. The animal, for example, a rat as illustrated, is anesthetized and placed upon the surface 14 so that an intact organ thereof is stationed within the field of view of the spectrofluorometer.

The selected internal organ 16, which may be the kidney, liver, intestine, heart, etc., is suitably prepared, biologically, for observation. For the purposes of this description, organ 16 will be the rat kidney. It is to be noted that the kidney capsule remains intact, and that the vessels 18 supplying blood flow thereto remain attached. A fixed stage or cup-shaped holder 20 is provided above the abdominal cavity so that the kidney is free from body contact and mechanical movements due to respiration are thus avoided.

Fluorescence excitation is provided by a radiant energy source 22. This has been illustrated as a conventional incandescent filament lamp source for purposes of description. In practice the excitation source may be selected on the basis of factors such as emission wavelength, intensity, heating effect, etc. In a preferred embodiment a high-pressure water-cooled ultraviolet arc, General Electric type AH6, has been found to be a convenient and stable source; permitting an intense excitation level to be located close to the spectrofluorometer objective. By means of a multi-element primary filter 24, which may be water cooled as indicated by the piping 26 and 28, excitation intensities are held to a level which is non-injurious to the tissues over extended observation periods. This filter or monochromator is selected to pass a desired wavelength for maximum absorption by the pyridine nucleotides. The Eppendor photometer filter as manufactured by Netheler and Heinz is one suitable design which has been used. Such filter transmits fifteen percent intensity at 366 m$\mu$ with a half-width of 30 m$\mu$.

The optical system 30 sharply focuses the excitation energy from source 22 upon the kidney surface or the capillaries lying immediately below the tissue surface. An additional filter 32 may also be utilized in the excitation optical system.

Fluorescent emission from the tissue passes upwards through the spectrometer optics 34, 36 and 38 and thence through a narrow aperture plate 40 to fall upon the input electrode of an energy transducing device, here represented by the photomultiplier tube 42. A secondary filter stage 44 is provided behind the microscope objective lens. Here, one or more filters, such as a color filter, or an interference filter of fixed or continuously variable wavelength, may be introduced into the optical chain in order to select the wavelength of the fluorescent emission from the irradiated tissue which reaches the photomultiplier conversion means.

For recordings at a fixed wavelength, the combination of a Wratten 2C filter at stage 44 together with a caesium antimony type S11 photomultiplier tube, EMI No. 9524B, has given a response constant to ten percent in the wavelength region 420 through 530 m$\mu$ where the peaks of the emission spectra of the various forms of reduced pyridine nucleotide of 440–480 m$\mu$ are expected. This combination of filter and photosurface gives an overall quantum efficiency of ten percent for the desired wavelength band. An ocular eyepiece 46, above filter stage 44, permits simultaneous visual observation and is of utility in monitoring the field of view when observing inhomogenous tissues.

Output from tube 42 is fed through an isolating cathode follower stage 48; and after further amplification, switching or detection, balancing and impedance matching as described in detail below; drives an output meter or chart recorder of standard commercial design (not shown) in accordance with the particular display or output record desired. Recorders such as the Varian G10, Esterline-Angus, or Rectiriter, are suitable for recording the measurements made in practicing the invention.

When a continuously variable wavelength scanning interference filter such as the Schott type is utilized at the secondary filter stage 44, it is mechanically connected in a known manner to the output chart recorder so as to correlate the fluorescence emission response over the spectral interval, rather than recording at a single fixed wavelength.

From the cathode follower stage 48, the output of the photomultiplier is coupled to an input potentiometer 50 of an A.C. amplifier shown symbolically at element 52, which may have a voltage gain of the order of one thousand. As shown in the main circuit diagram of FIGURE 1, the amplifier output is coupled by transformer 54 to a switching demodulator which includes the blade 56, fixed contacts 58 and 60, and a drive coil or solenoid 62 mechanically connected to blade 56.

Excitation energy from source 22, i.e., ultraviolet light in the preferred embodiment, may be modulated in any convenient fashion so that the output of the photomultiplier can be limited to the peaks of the emission spectra for intensity recording. This is a preferred method of operation for diagnosis of the state of binding of the pyridine nucleotide, and further serves to minimize noise and random effects.

One feasible modulation method is to employ commercial 60-cycle power to operate light source 22. Such a method is indicated in FIGURE 1 by element 64. The same 60-cycle A.C. power is utilized to drive the switching solenoid 62 which vibrates blade 56, as indicated diagrammatically by the symbols x—x. Since the peaks of the emission spectra occur at a repetition rate which is based upon a 120 c.p.s. modulation frequency, the demodulation effected by the vibrating switch blade 56 permits the intensity of the fluorescence to be measured on an "absolute" basis. Thus, for example, when blade 56 touches contact 58 the peak value of the intensity of the emission pulse is passed to the output chart recorder, and when blade 56 touches contact 60 the dark current of the photomultiplier tube is passed as a reference.

The detected peak voltage output is connected through double R-C time constant networks 66–68 and 70–72 to the input grid 74 of a balanced cathode follower driver 76, 78 for the output meter or recorder. The networks filter or integrate the signal, and the resistor-condenser values may be varied to meet differing needs for response speeds.

Zero-set for the output meter is provided by means of the arm of potentiometer 80 whose total resistance value may equal or differ from the sum of the resistances of the equal valued resistors 82 and 84. The circuit is suitably energized from a D.C. power source at terminals 86 and 88. Conventional circuit design, well known to those skilled in the art, is utilized in the remainder of the circuitry, including a decoupling network in the B+ feed to amplifier 52, cathode bias resistors, etc. Since such remaining design factors are known, further discussion of them is deemed unnecessary.

Thus, the main circuit of FIGURE 1 provides a balanced cathode follower drive to the output meter or recorder. It is an A.C. signal system of outstanding simplicity, with the zero-set sufficient to deflect the meter off scale by over 100 percent for recording small changes in a large fluorescence. The output of this circuit may be rapidly adjusted to a required response level to provide registration of changes of fluorescence corresponding to a few hundred microvolts without the need for additional millivolt level amplification for driving a chart recorder.

Operation of FIGURE 1 will next be described, bearing in mind the previously outlined teaching that the component of fluorescence emission from the intact organ which is of interest is that which changes with the degree of oxygenation of the tissue or the degree of metabolic activity—fluorescence changes due to the extent of reduction of pyridine nucleotide. A considerable increase in fluorescence occurs when nitrogen replaces oxygen.

With the microscope focused on the kidney cortex 16 of the anesthetized rat, the field as viewed through ocular 46 appears pale blue and the small blood vessels are seen in dark outlines against the uniform blue background. The microscope is focused on an area of bright fluorescence containing a minimum of blood vessels.

Two types of recording are used, one a time recorder and the other a wavelength recorder. With the interference filter at stage 44 set at 470 m$\mu$, a time recording of several minutes is taken in order to ensure that a stable base-line is obtained with the animal breathing oxygen. Then a spectrum is run through and appears as the lower trace of FIGURE 2. The peak of the emission spectrum lies near 475 m$\mu$, and the shape of the emission spectrum suggests that only one component is involved. The inspired gas is then changed to nitrogen, fed from the tank 90 through oximeter valve means 92 and tubing 94 which connects to a tracheal cannula (not shown) which has been inserted in the wind-pipe. When the time recorder indicates that the fluorescence has reached a plateau approximately thirty seconds after cessation of breathing, the second spectrum is run. This requires approximately a minute. This time interval is sufficiently short that the animal may be resuscitated by the use of a few manual ventilations following a change of the inspired gas to 100 percent oxygen. When breathing is resumed, a third spectrum may be run in order to bracket the anoxic spectrum with two aerobic ones. Such a third spectrum has not been illustrated, as it would follow very closely the lower aerobic ($O_2$) trace.

The fluorescence intensity obtained in anoxia is 60 percent higher than in the aerobic condition. The peak of the emission spectrum obtained in anoxia is at approximately 470 m$\mu$, and the distribution of energy is maximal at a slightly shorter wavelength than when the animal breathes oxygen. This suggests a greater contribution of bound reduced pyridine nucleotide, presumably that of the mitochondria. The absence of prominent emission bands in the region of 540 m$\mu$ indicates that no measurable amount of free flavin is present in the areas under observation in either aerobic or anoxic states.

FIGURE 2 thus relates the relative level of fluorescence emission of the pyridine nucleotide caused by aerobic-anoxic transition. Fluorescence increase is plotted in an upward direction, and the spectral band wavelength horizontally.

A time recorder has been mentioned above as used to ensure a stable base-line. FIGURE 3 illustrates a recording made on the basis of the length of time of inspiration in the animal. This is a second approach to the question of the oxygen sensitivity of the cortex which is afforded by experiments in which the oxygen concentration in the inspired air, curve 96, is held at low values that give various percentages of fluorescence increase, curve 98. The first measurable increase in fluorescence is observed when the percentage of oxygen falls to 8. A partial recovery of the initial fluorescence level is obtained by returning to an oxygen concentration of 20 percent. In a second interval of anoxia the fluorescence increase fluctuated between 30 and 60 percent with an oxygen percentage of about 4. It is difficult to stabilize the values at a 50-percent increment of reduction. The times when breathing stopped and started again are indicated on curve 98.

FIGURE 3 thus illustrates the correlation of the percentage of oxygen in inspired air with the increase in fluorescence emission intensity increase, which intensity is plotted in a downward direction. Traces 96 and 98 were experimental data obtained as measured on the brain cortex of a rat under anesthesia, rather than on the kidney cortex as illustrated in FIGURE 1. However, other experimental data indicates that the oxygen affinities of kidney and brain mitochondria are the same, although the oxygen sensitivity of these two organs may show a tenfold difference in the intracellular oxygen tension at the moment of cessation of breathing.

An important factor in understanding this invention is the observation of the increase in fluorescence emission in relation to the oxygen concentration. This is illustrated in FIGURE 4 in which curve 100 is a calibration curve.

Realizing that the traces in FIGURE 3 were obtained from a rat brain cortex, rather than the liver, immediately suggests that by merely duplicating the basic spectrofluorometer arrangement 10 of FIGURE 1, thus exciting and observing the fluorescence emission of a second intact organ of the animal, simultaneous data may be obtained for comparison of the oxidation-reduction states in two living organs. This is discussed to a greater extent below with regard to the several possible modes of practicing this invention. It is sufficient to note at this point that simultaneous records have been obtained, and in the case of kidney/brain observation the animal has been prepared by carefully removing a section of the skull so as to minimize bleeding into the field of observation; exposing about twenty-five square millimeters of the brain cortex. The animal was positioned belly down, with the brain cortex in the field of view of a first spectrofluorometer. The kidney was held in a clamp or fixed stage comparable to cup 20 of FIGURE 1, which was above the back of the animal, with the second spectrofluorometer focused thereon. Quartz light pipes or fibre optics may be employed to record from less accessible organs.

In FIGURE 1, changes in the oxygen supply to the kidney 16 may be accomplished by one of three methods: (i) The animal is provided with a tracheal cannula, and inspired gases are controlled as desired and monitored by an oximeter. This is the method previously described with the elements 90–92–94, and is a most satisfactory and preferred embodiment. Nitrogen or carbon monoxide may be used to replace the oxygen. (ii) A simple mechanical clamp, shown schematically at element 102, is used to shut off the blood supply through the blood vessels 18 supplying the kidney. (iii) Drugs, such as respiratory inhibitors, barbiturates, etc., may be administered. A hypodermic syringe 104 connected to cannula 106 is inserted in the femoral vein, as shown generally at the hind limb of the animal. Obviously cannulation of other veins and also arteries may be employed to add various drugs to the circulation.

By way of example only, and not as a limitation to the practice of the invention, sodium sulfide has been infused into the vena cava to inhibit respiration; and norepinephrine in the vena cava or in the renal artery resulted in occlusion of circulation. Amobarbital (Amytal) has also been infused into the vena cava, with observed fluorescence emission increases indicative of increases in the reduction of pyridine nucleotide recorded at both the brain and the kidney, with greater effects observed in the kidney at lower blood concentrations than in the brain. Injections of adrenocorticotrophic hormone (ACTH) into the vena cava have been made, with emission spectra indicative of induced oxidation obtained from the adrenal cortex. The biochemical effects of epinephrine (EPI) upon glycogen breakdown and phosphate formation have been recorded with the spectrofluorometer focused on the surface of the heart.

It should be noted that the oxygen inhibition methods of the type (iii) described above by drug or hormone infusion may be varied or combined with the type (i) oxygen-nitrogen inspiration transition as a convenient control comparison arrangement. Further, various reagents can be added to the circulation by cannulation at the vena cava, renal artery or carotid artery; as, for example, perfusion with Ringer solution to replace part of the blood volume.

*Modes of operation*

In some versions of the apparatus a vibrating diaphragm light chopper valve located at the secondary filter stage 44 has been used to effect modulation of the fluorescence emission, with demodulation of the output as previously described for the main circuitry of FIGURE 1. Two different areas of the same cell may thus be compared; or a reference standard such as the emission with a fluorescent standard, such as Corning type 360 glass, may be compared differentially using the balanced cathode follower circuit of FIGURE 1. This is a single input channel operation, with a double-ended output.

Another mode of single channel operation is illustrated at (a) of FIGURE 1. This is suitable where the changes of fluorescence are sufficiently large so that a single-ended output may be employed. Thus, the fragmentary circuit (a) indicates that the output from the switching demodulator at contacts 58 and 60 is applied to only a single cathode follower driver, at the grid 74 of tube 76.

A two-channel input arrangement is necessary for the simultaneous comparison of oxygenation of two organs as previously described. This mode of operation is achieved by the introduction of the sub-circuit illustrated at (b) of FIGURE 1 wherein like reference numerals indicate similar circuit elements. A time-selected bidirectional demodulation is provided, whereby an output of one spectrofluorometer is fed to the terminal 108, or channel A; and the output of a second identical spectrofluorometer focused on a second organ is fed to the terminal 110, or channel B. In this two-channel embodiment, a center-tapped transformer 54′ is substituted for transformer 54 in the main circuit diagram. A first switch detector solenoid 112 is energized at a double cyclic frequency rate of 120 c.p.s. as indicated at $y$—$y$, so as to provide timed demodulation for both channel inputs. A second vibrating switch has its solenoid 62′ energized at 60 c.p.s. as indicated at $x$—$x$, so as to feed the output of the two channels alternately to the outputs 108 and 110. Dual output meters may be provided, and waveforms may be displayed as displaced traces for this simultaneous double aperture observation of the two animal organs. A recorder equipped for dual channel inputs having displaced pens may be used, or a split trace cathode-ray oscilloscope presentation may be used, all as is well known in the art. The particular type of output display method utilized is not a part of this invention; but it is to be understood that each of the outputs at 108 and 110 is fed into a two-stage R-C integrating filter and the differential double cathode follower driver stages, all as previously described for the one-channel operation of FIGURE 1.

The ability of obtaining emission spectra from tissue areas in vivo so as to provide a nondestructive indication of the oxidation state in one, or a plurality of animal organs, in the presence of hemoglobin is a primary advantage of this invention. The relationship between intracellular oxidation-reduction levels of mitochondrial pyridine nucleotide and some elementary physiological functions is also obtainable with the invention as described. Obvious extensions of the principles and techniques described above will occur to those skilled in the art. For example, increases in oxygenation as measured by decreases of fluorescence emission intensities are obtainable when respiratory inhibitors such as hydrogen cyanide or hydrogen sulfide are used, whose action on the hemoglobin is opposite to that caused by nitrogen.

While a particular preferred embodiment of the invention has been described, together with several variant modes of operation, it will, of course, be understood that it is not limited thereto since many changes and modifications of the method and apparatus used may be made. It is contemplated by the appended claims to cover any such modifications as fall within the true spirit and scope of this invention.

We claim:

1. An apparatus for nondestructively measuring the intracellular oxidation-reduction state in exposed surface tissue of intact internal organs of a living animal comprising, in combination, means to irradiate said tissue with radiant energy of a predetermined wavelength, and means to measure intracellular oxidation-reduction levels as evidenced by changes in the fluorescence emission spectra of mitochondrial pyridine nucleotide near the exposed irradiated surface.

2. An apparatus for nondestructively measuring the intracellular oxidation-reduction state in exposed surface tissue of intact internal organs of a living animal comprising, in combination, means to irradiate said tissue with radiant energy of a predetermined wavelength, and means to measure intracellular oxidation-reduction levels as evidenced by changes in the fluorescence emission spectra of mitochondrial pyridine nucleotide below the exposed irradiated surface.

3. A method of in vivo determination of intracellular oxidation-reduction states of living tissue including the steps of:
   (1) irradiating a living organ with electromagnetic radiation of a wavelength between 330 and 400 millimicrons
   (2) measuring the resulting fluorescence emission radiation in the wavelength range 400 to 600 millimicrons from said living organ.

4. The method of claim 3 wherein the measurement in step (2) comprises a continuous scanning from one end of a wavelength range, and including the additional step of recording said measurement.

5. The apparatus of claim 1 wherein said last mentioned means includes a continuously variable scanning filter in combination with a recorder, whereby the fluorescence emission spectra from the tissue is scanned over a range of wavelengths and its wavelength maxima determined.

6. The apparatus of claim 2, wherein said last mentioned means includes a continuously variable scanning filter in combination with a recorder, whereby the fluorescence emission spectra from the tissue is scanned over a range of wavelengths and its wavelength maxima determined.

References Cited by the Examiner

UNITED STATES PATENTS

| | | | |
|---|---|---|---|
| 1,974,522 | 9/1934 | Twyman et al. | 88—14 |
| 2,439,857 | 4/1948 | Millikan | 88—14 |
| 2,442,462 | 6/1948 | Kirschbaum | 88—14 |
| 2,640,389 | 6/1953 | Liston | 88—14 |
| 2,678,692 | 5/1954 | Ranseen. | |
| 2,706,927 | 4/1955 | Wood | 88—14 |
| 2,776,377 | 1/1957 | Anger | 128—2 X |
| 2,790,438 | 4/1957 | Tapline et al. | 128—2 |
| 3,000,805 | 9/1961 | Caritt et al. | 128—2 X |
| 3,029,682 | 4/1962 | Wood et al. | 88—14 |
| 3,115,131 | 12/1963 | Holliday | 128—2 |
| 3,151,204 | 9/1964 | Stacy | 88—14 |
| 3,233,450 | 2/1966 | Fry | 128—2.1 X |

ROBERT E. MORGAN, *Acting Primary Examiner.*

SIMON BRODER, RICHARD A. GAUDET,
*Examiners.*